Sept. 21, 1965            J. E. HICKS           3,207,866
AUTOMATIC VARIABLE TIME CONTROLS FOR
ELECTRICALLY OPERATED MECHANISMS
Filed Dec. 17, 1962           6 Sheets-Sheet 1

INVENTOR.
John E. Hicks

BY Ahley & Ahley

ATTORNEYS

Sept. 21, 1965  J. E. HICKS  3,207,866
AUTOMATIC VARIABLE TIME CONTROLS FOR
ELECTRICALLY OPERATED MECHANISMS
Filed Dec. 17, 1962  6 Sheets-Sheet 2

INVENTOR.
John E. Hicks
BY *Ehley & Ehley*
ATTORNEYS

*INVENTOR.*
John E. Hicks
BY *Ehley & Ehley*
ATTORNEYS

INVENTOR.
John E. Hicks
BY Ashley & Ashley
ATTORNEYS

Sept. 21, 1965  J. E. HICKS  3,207,866
AUTOMATIC VARIABLE TIME CONTROLS FOR
ELECTRICALLY OPERATED MECHANISMS
Filed Dec. 17, 1962  6 Sheets-Sheet 5

INVENTOR
John E. Hicks

BY *Shley & Shley*

ATTORNEYS

Sept. 21, 1965 J. E. HICKS 3,207,866
AUTOMATIC VARIABLE TIME CONTROLS FOR
ELECTRICALLY OPERATED MECHANISMS
Filed Dec. 17, 1962 6 Sheets-Sheet 6

INVENTOR
John E. Hicks

BY *Ahley & Ahley*

ATTORNEYS

United States Patent Office 3,207,866
Patented Sept. 21, 1965

3,207,866
AUTOMATIC VARIABLE TIME CONTROLS FOR ELECTRICALLY OPERATED MECHANISMS
John E. Hicks, Ardmore, Okla., assignor to Telsco Industries, Dallas, Tex., a corporation of Texas
Filed Dec. 17, 1962, Ser. No. 247,437
26 Claims. (Cl. 200—38)

This invention relates to new and useful improvements in automatic, variable time controls for electrically operated mechanisms.

One object of the invention is to provide an improved control of relatively simple, economical construction for automatically operating a lawn sprinkler system or other systems having a plurality of valves or other mechanisms.

Another object of the invention is to provide an improved automatic time control for actuating a plurality of mechanisms in sequence at predetermined intervals for variable periods of operation wherein the operating periods may be varied independently of one another.

A further object of the invention is to provide an improved automatic time control, of the character described, having novel means for initiating operation of the mechanisms at predetermined periods of time, for sequentially actuating said mechanisms through a cycle, and for individually regulating the operating period of each mechanism whereby the duration of operation may vary from mechanism to mechanism.

A particular object of the invention is to provide an improved automatic time control, of the character described, having rotary means which is adapted to be revolved intermittently for cyclic actuation of the mechanisms and coacting rotary means which revolves constantly for initiating rotation of the first rotary means so as to commence operation of said mechanisms.

An important object of the invention is to provide an improved automatic time control, of the character described, wherein the rotary means for actuating the mechanisms is arranged to be inoperative during the major portion of revolution of the coacting rotary means and revolves at a greater rate of speed than the latter so as to be in position for commencing operation during more than one portion of revolution of said coacting means.

A construction designed to carry out the invention will be hereinafter described, together with other features of the invention.

The invention will be more readily understood from a reading of the following specification and by reference to the accompanying drawings, wherein examples of the invention are shown, and wherein.

Figure 2:
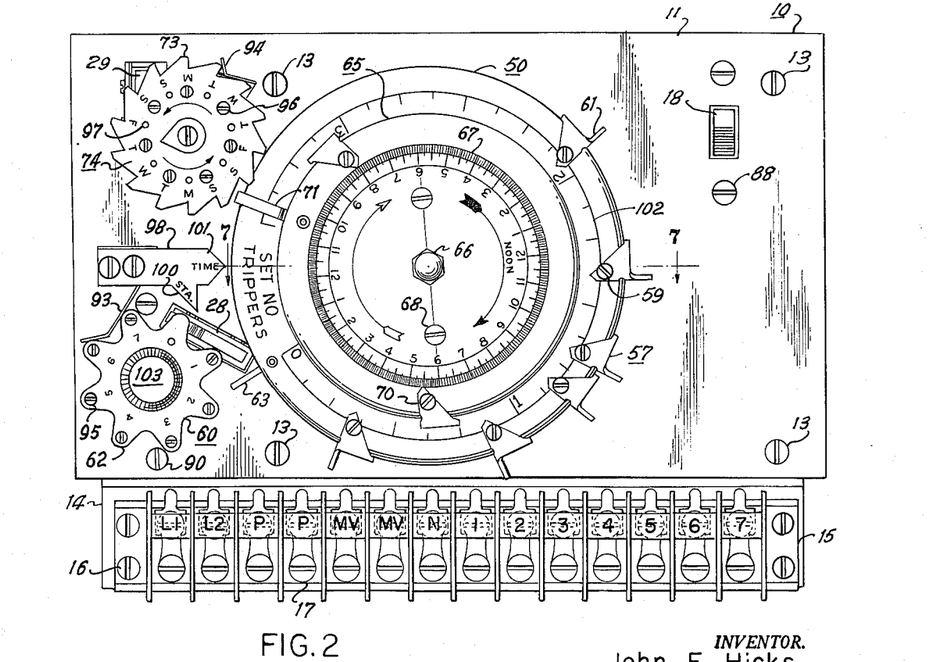
FIG. 2 is a front elevational view of the control.
Figure 4:
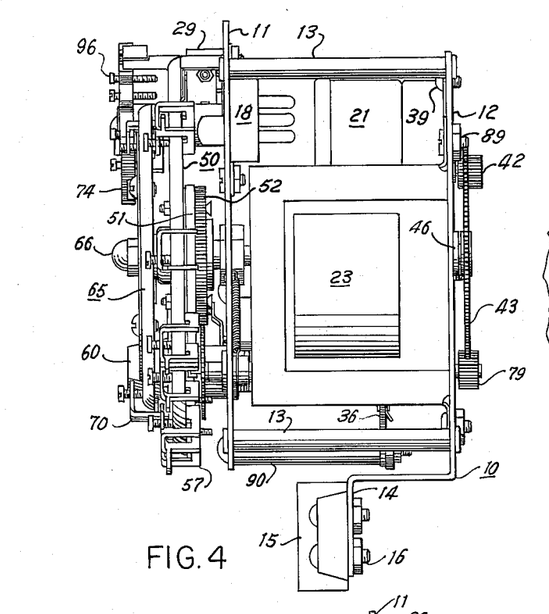
FIG. 4 is a left end elevational view of the control.

In the drawings, the numeral 10 designates the chassis of an automatic, variable time control having a pair of upright, rectangular plates 11 and 12 secured in parallel, spaced relationship by suitable transverse posts 13. The control is particularly adapted for operating a lawn sprinkler system (not shown) of the type having an electrically-operated master valve, a plurality of secondary or station valves for controlling the flow of water to independent groups or series of sprinklers and, if desirable or necessary, a pump; however, the control may be employed to operate other types of systems. As shown most clearly in FIGS. 4 and 5, a forwardly-offset flange 14 is formed on the lower margin of the back plate 12 for supporting an elongate terminal block 15 which is attached thereto by nuts and bolts or other fasteners 16. The terminal block 15 carries a plurality of electrical terminals 17 for connection with a source of electrical current at L1 and L2, a pump starter at P and P, a main control mechanism or valve at MV and MV, a ground or neutral at N, and secondary or station control mechanisms or valves at 1 through 7 (FIG. 2). The number of secondary or station control valves is subject to variation and the number of terminals 17 may be increased or decreased accordingly or all of said terminals need not be used. It is contemplated that the terminals may be connected to other mechanisms for controlling the actuation thereof at predetermined intervals for variable periods of time.

Figure 10:
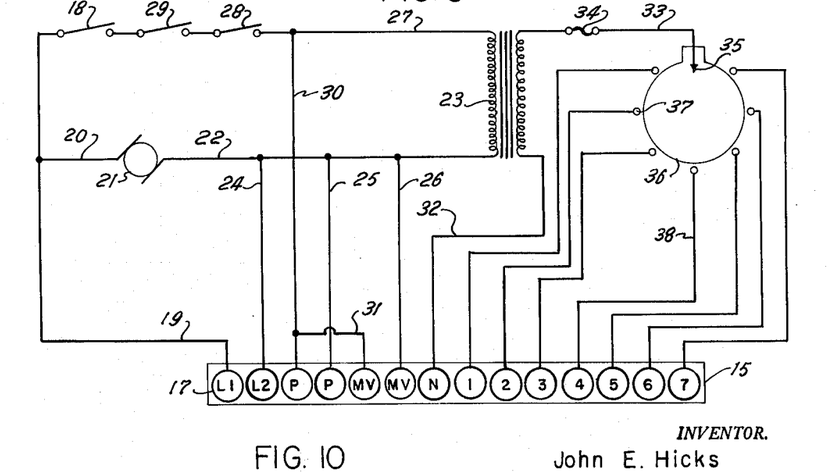
FIG. 10 is a schematic view of the wiring diagram.

The L1 terminal is connected to a master switch 18 by a lead 19 from the intermediate portion of which a lead 20 extends to a clock motor 21 (FIG. 10). A lead 22 connects the clock motor 21 to a transformer 23 and has leads 24, 25 and 26 extending from its intermediate portion to the L2, one P and one MV terminals, respectively. The transformer 23 is connected to the master switch 18 by a lead 27 which has a pair of switches 28 and 29 therein. A lead 30 extends from the lead 27, between the transformer and switch 28, to the other P terminal and is connected by a lead 31 to the other MV terminal. The transformer is connected by a lead 32 to the N terminal and by a lead 33, having a fuse or circuit breaker 34 therein, to the wiper arm 35 of a conventional rotary selector switch 36 which has multiple contacts 37, one for each of the 1–7 terminals and connected thereto by separate leads 38.

Figure 1:
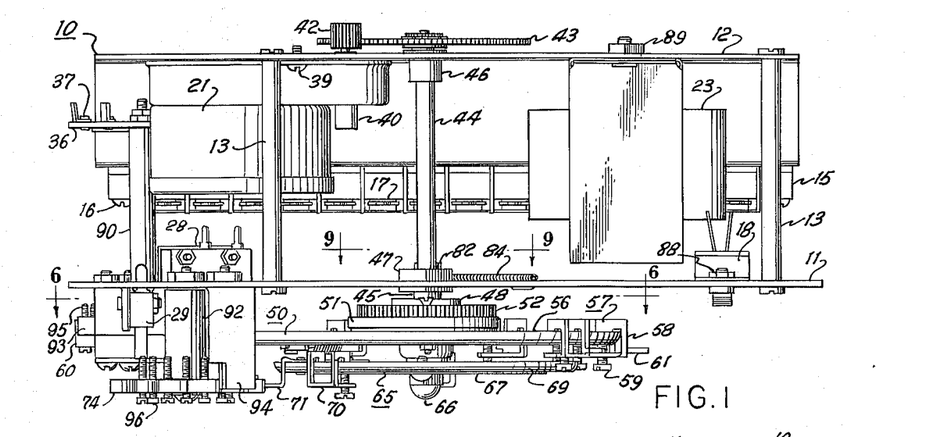
FIG. 1 is a top plan view of an automatic, variable time control constructed in accordance with the invention.
Figure 3:
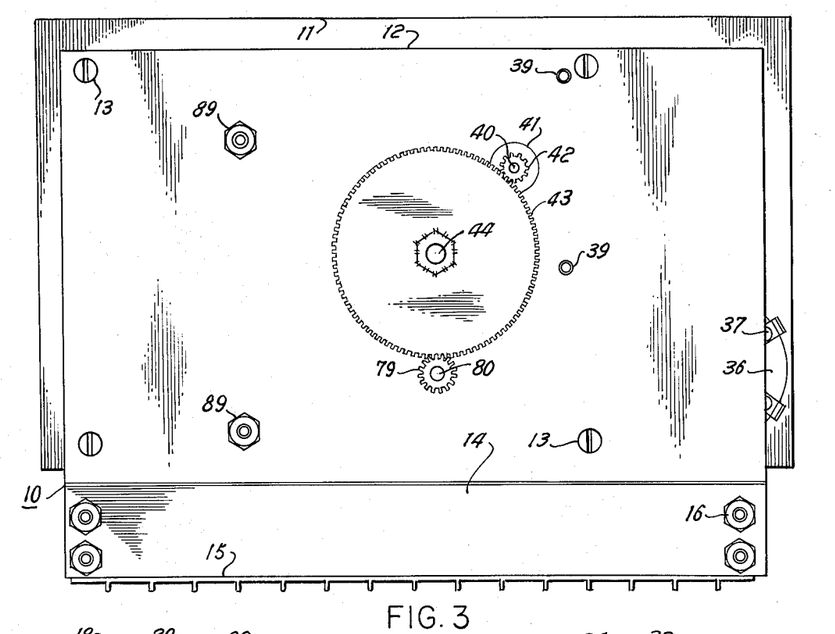
FIG. 3 is a rear elevational view of the control.
Figure 5:
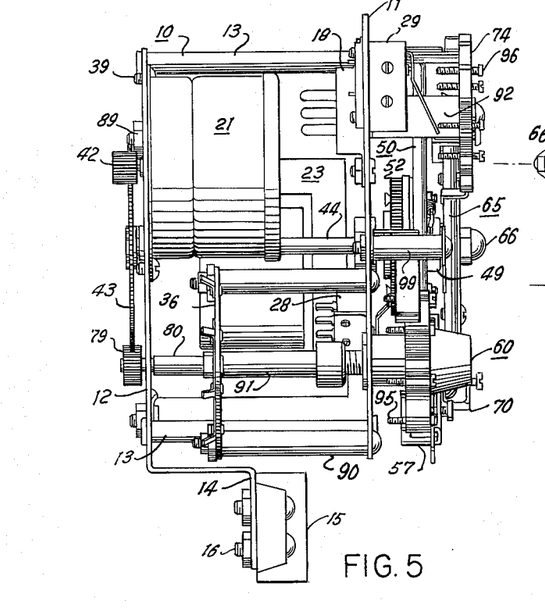
FIG. 5 is a right end elevational view of the control.
Figures 7, 8, 11:
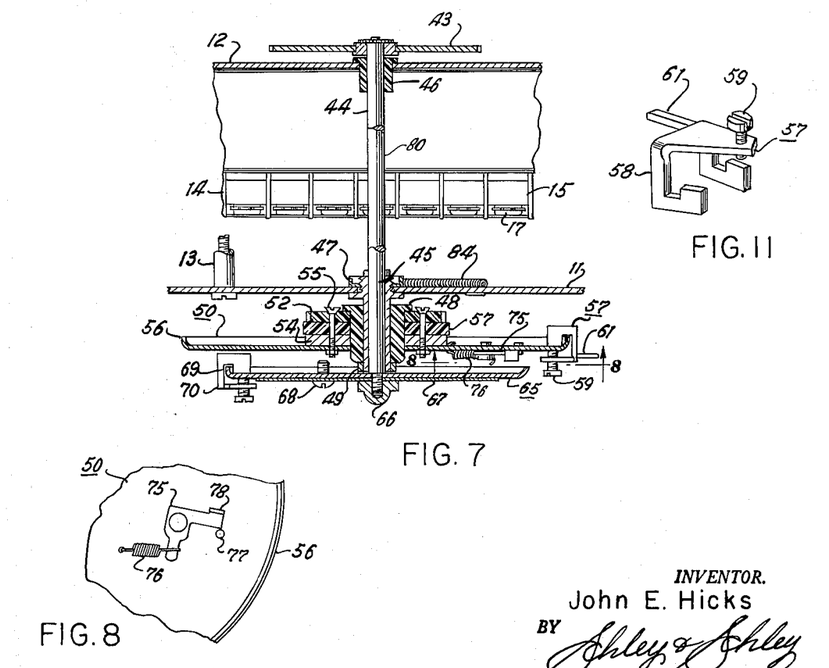
FIG. 7 is a horizontal, cross-sectional view, taken on the line 7—7 of FIG. 2, showing the relationship of the disks of the drive shafts.
FIG. 8 is a vertical, sectional view, taken on the line 8—8 of FIG. 7, showing the spring-biased mounting of the pawl on one of the disks for permitting rotation thereof relative to the other disk.
FIG. 11 is an enlarged, perspective view of one of the actuating elements adapted to be carried by one of the disks.

As shown by the numeral 39 in FIGS. 1, 3 and 5, the clock motor 21 is attached to the front surface of the back plate 12 and has its drive shaft 40 projecting rearwardly through an opening 41 in said plate for supporting a pinion 42 in meshing engagement with a gear 43 of much larger diameter. The gear ratio between the pinion 42 and gear 43 is such that said gear makes one complete clockwise revolution (FIG. 2) every twenty-four (24) hours or other predetermined period of time. A shaft 44, having the gear 43 fixed on its rear end, extends transversely between and projects exteriorly of the front and back plates through bearings 45 and 46 mounted in said plates (FIG. 7). The bearing 45 of the front plate 11 is in the form of a flanged sleeve or elongate collar secured to said plate as shown at 47 and extending forwardly thereof. A flanged bushing 48 is rotatably journaled on the sleeve bearing for supporting a circular dial or disk 50, a cam member 51 and a gear 52 whereby the disk, cam member and gear are rotatable relative to the shaft. The cam member 51 is disposed between the disk 50 and gear 52, said disk being spaced from said member by an annular element or ring 54 and being attached thereto and to said gear by suitable nuts and screws or other fasteners 55.

An inturned flange or rearwardly-directed lip 56 is formed on the periphery of the disk 50 for adjustably supporting a plurality of actuating elements or clips 57, each of which has a pair of J-shaped legs 58 for engaging around the lip and a set screw 59 for bearing against the outer face of said disk to hold the clip in place (FIGS. 2, 6, 7 and 11). As will be explained, the clips 57 function as trippers and are adapted to actuate a star wheel or rotary member 60 and have arms 61 projecting radially of the disk for engaging the points or teeth 62 of the wheel for imparting rotation thereto. A somewhat similar actuating element or starting finger 63 is secured by rivets or other fasteners 64 to the disk so as to project radially therefrom for contact with the points 62 of the star wheel 60. The front end of the shaft 44 has a circular dial or disk 65, of less diameter than the disk 50, fixed thereon by a suitable nut 66 and spaced from said disk 50 by an annular element or ring 49 rotatably mounted on the forwardly-projecting end of the sleeve bearing 45 so as to permit relative rotation of said disk 50. A twenty-four (24) hour dial plate or clock face 67 is suitably fastened, such as by screws 68, to the disk 65 which has an inturned flange or rearwardly-directed lip 69 on its periphery for adjustably supporting one or more elements or clips 70, similar to the clips 57 but lacking the radial arms thereof. Also, the disk 65 has an actuating element or finger 71, similar to the finger 63, projecting radially therefrom and having an angular, forwardly-offset outer end portion 72 for engagement with the ratchet teeth 73 of a calendar wheel or rotary member 74 so as to turn the same.

Figure 6:
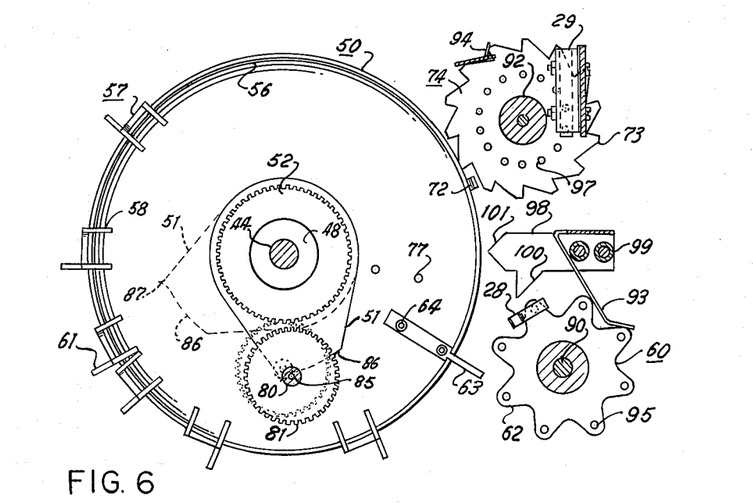
FIG. 6 is a vertical, sectional view, taken on the line 6—6 of FIG. 1, showing the normally meshing gears of the drive shafts disengaged.

As shown most clearly in FIG. 8, an angular pawl 75 is pivotally mounted on the disk 50 and is urged clockwise by a helical spring 76 into engagement with a post 77 on said disk. Adjacent the post 77, the pawl 75 has a forwardly-projecting lug 78 for engagement with one of the clips 70 of the disk 65 and transmittal of clockwise rotation from said disk to the disk 50. Due to its spring-pressed, pivotal mounting, the pawl may undergo limited counterclockwise pivoting so as to bypass or overrun the clips 70 and permit clockwise rotation of the disk 50 relative to the disk 65. As will be expained, the disk 50 revolves at a greater rate of speed than the disk 65, approximately 6 to 1, so that it is necessary to permit the pawl 75 to overrun one or more of the clips. For driving the disk 50, a pinion 79 meshes with the gear 43 (FIG. 3) and is of much smaller diameter so as to revolve at a greater rate of speed. The pinion 79 is fixed on the rear end of a shaft 80 which projects forwardly through the back and front plates 12 and 11 of the chassis, below and in substantially parallel alinement with the shaft 44, and which has a gear 81 fixed on its front end for meshing with the gear 52 (FIGS. 6 and 7). It is noted that the gear 81 is of much larger diameter than the pinion 79 and coacts therewith to drive the gear 52, cam 51 and disk 50 at a much greater rate of speed than the disk 65 which is driven by the gear 43 and its shaft 44.

Figure 9:
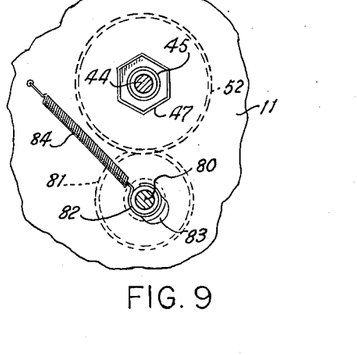
FIG. 9 is a vertical, sectional view, taken on the line 9—9 of FIG. 1, showing the spring-biased mounting of one of the drive shafts.
Figure 12:
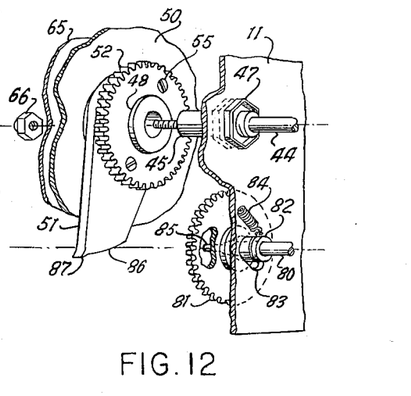
FIG. 12 is a broken, perspective view showing the relationship of the disks, gears and cam member.

As shown in FIG. 9, a flanged bushing 82 is carried by the shaft 80 for slidable engagement in an inclined, elongate opening or slot 83 extending diagonally of the front plate to permit movement of the front end of said shaft upwardly toward and downwardly away from the shaft 44 for meshing and unmeshing of the gears 81 and 52. The gears are urged into engagement by a helical spring 84, of relatively weak strength, which connects the bushing 82 to the front plate, and the gear 81 is adapted to be moved out of mesh with the gear 52 by the cam member 51. A pin 85 (FIGS. 6 and 12) projects axially from the shaft 80 for engagement by a face 86 on the outer end of the cam member which projects laterally beyond the periphery of the gear 52. The cam face 86 has a counterclockwise inclination, clockwise in FIG. 6, so as to gradually engage the pin 85 and pivot the front end of the shaft 80 downwardly or away from the shaft 44 to unmesh the gear 81 from the gear 52 upon clockwise rotation of the cam member 51 with said gear. As shown by the numeral 87, a lug or projection is formed at the counterclockwise end of the cam face, such as by notching or recessing said face, for engaging the pin and holding the gear 81 out of mesh with the gear 52 whereby the disk 50 may remain stationary during rotation of the disk 65. It is noted that the spring 84 urges the gear 81 in a direction opposite the driving force at the point of meshing of said gear with the gear 52 and that said spring need be of a strength sufficient only to cause meshing of said gears since the meshed gears remain in mesh.

As shown by the numeral 88 in FIG. 1, the master switch 18 is mounted on the front plate 11 of the chassis and the transformer 23 is secured by suitable fasteners 89 to the back plate 12 adjacent said switch. Also, the switches 28 and 29 are suitably mounted on the front plate in underlying relation to the star wheel 60 and calendar wheel 74, respectively, for actuation thereby (FIGS. 2 and 5). Suitable transverse posts 90 extend rearwardly from the front plate for supporting the rotary selector switch 36 adjacent the back plate and in axial alinement with the star wheel, and the wiper arm 35 of said switch is mounted on the rear end of a shaft 91 journaled in and extending through said front plate for driving connection with said star wheel. The calendar wheel is disposed above and forwardly of the star wheel and is fixed to the front end of a stub shaft 92 rotatably supported by the front plate 11. Resilient detents 93 and 94 are suitably mounted on the front plate for engaging the points 62 of the wheel 60 and the ratchet teeth 73 of the wheel 74, respectively, to resist rotation of said wheels and prevent reverse or clockwise turning of said wheel 74.

The star wheel has a point for each of the 1 through 7 terminals and their secondary control mechanisms or valves (FIG. 2) and an "off" or 0 point, with the 1 through 7 points carrying transverse elements, such as rearwardly-extending pins or screws 95, for actuating the switch 28. Similar elements in the form of pins or screws 96 extend rearwardly from the calendar wheel for actuating the switch 29, being threaded through openings 97 which correspond in number to the teeth 73. Although any suitable number of teeth may be provided, fourteen (14) are shown and are marked with the initials of the days of two (2) weeks. Any desirable number of the screws 96 may be utilized. An indicator 98 is suitably mounted on the front plate between the wheels 60 and 74 by suitable means, such as posts 99, and has a STA pointer 100 directed toward said wheel 60 and a TIME pointer 101 extending toward the disk 50. The latter has indicia 102 extending counterclockwise of the finger 63 and designating three and one-half (3½) hours in increments of seven and one-half (7½) minutes to permit accurate setting of the clips 57, said disk being adapted to complete a revolution in four (4) hours, and a sector clockwise of said finger bearing the legend SET NO TRIPPERS. The star wheel has a forwardly-projecting, knurled knob 103 to facilitate manual turning of said wheel.

In operation, the master switch 18 is closed and the pins or screws 96 are positioned in alternate or other desired openings 97 of the calendar wheel 74 to determine the frequency or daily programming of operation of the automatic time control. The clips 57 are positioned on the disk 50 in accordance with the desired actuation of the star wheel 60, and the clip or clips 70 are positioned on the disk 65 for engagement with the pawl 75 in accordance with the desired frequency of rotation of said disk 50. The star wheel is turned by its knob 103 so as to dispose its 0 point adjacent the STA point 100 in overlying relation to the switch 28 so that said switch is open, as shown in FIG. 2. The starting finger 63 of the disk 50 is positioned adjacent the star wheel so that the legend SET NO TRIPPERS is adjacent the TIME pointed 101 and the cam member 51 is engaged with the pin 85 of the shaft 80 to hold the gear 81 out of mesh with the gear 52 (FIG. 6) and prevent rotation of said disk. The wiper arm 35 of the rotary selector switch 36 is in the position shown in FIG. 10 disengaged from the contacts 37.

Since the disk 65 is constantly driven clockwise (FIG. 2) by the motor 21 through the pinion 42, gear 43 and shaft 44, the finger 71 strikes the adjacent tooth 73 of the calendar wheel 74 so as to turn said wheel counterclockwise whereby one of its screws 96 may engage and close the switch 29. The continued rotation of the disk 65 moves one of its clips 70 into engagement with the pawl 75 whereby the disk 50 is rotated clockwise and the cam member 51 turns therewith to move its face 86 out of engagement with the pin 85 (FIG. 6) and permit the gear 81, which is constantly rotating, to mesh with the gear 52. Due to its greater speed of rotation, the disk 50 revolves relative to the disk 65 and moves its pawl out of engagement with the engaged clip of said disk 65 as well as past any other clips which may be mounted thereon. This rotation causes the finger 63 to strike the 1 or first point of the star wheel 60 so as to rotate said wheel counterclockwise whereby the screw 95 of said 1 point engages and closes the switch 28. Assuming that the switch 29 is closed due to engagement by one of the screws 96 of the calendar wheel 74, electrical current is supplied through the transformer 23 to the wiper arm 35 of the rotary selector switch 36 (FIG. 10). Since the wiper arm turns with the star wheel, it engages the contact 37 which is connected to the 1 terminal so as to transmit current thereto for operating its valve or other mechanism.

This operation continues until the rotation of the disk 50 is sufficient to cause the first of the clips 57, the one counterclockwise adjacent the finger 63, to strike the 2 point of the star wheel 60 and turn said wheel as well as the wiper arm 35 counterclockwise whereby the screw 95 of the 1 point disengages the switch 28 and said arm moves from the first to the second contact of the rotary selector switch. If the 2 point carries an actuating pin or screw, the switch 28 again closes so that current is supplied to the 2 terminal. This operation is repeated successively until the last clip 57, the one clockwise adjacent the finger 63, strikes the 0 point of the star wheel so as to disengage the screw 95 of the 7 point of said wheel from the switch so as to permit opening of the same due to the overlying relationship of said 0 point. The wiper arm 35 is returned to the position shown in FIG. 10 and the cam member 51 is returned to the position shown in FIGS. 6 and 12 so as to move the gear 81 out of mesh with gear 52 and prevent continued rotation of the disk 50. If more than one clip 70 is mounted on the disk 65, the disk 50 will be rotated more than once during each revolution of said disk 65 due to the engagement of the clip with the pawl 75 so as to repeat the described cycle of operation of the star wheel and the actuation of the secondary or station control mechanisms or valves. Of course, the operation of the star wheel 60 is dependent upon the position of the calendar wheel 74 since the switch 29 as well as the switch 28 must be closed.

Figure 13:
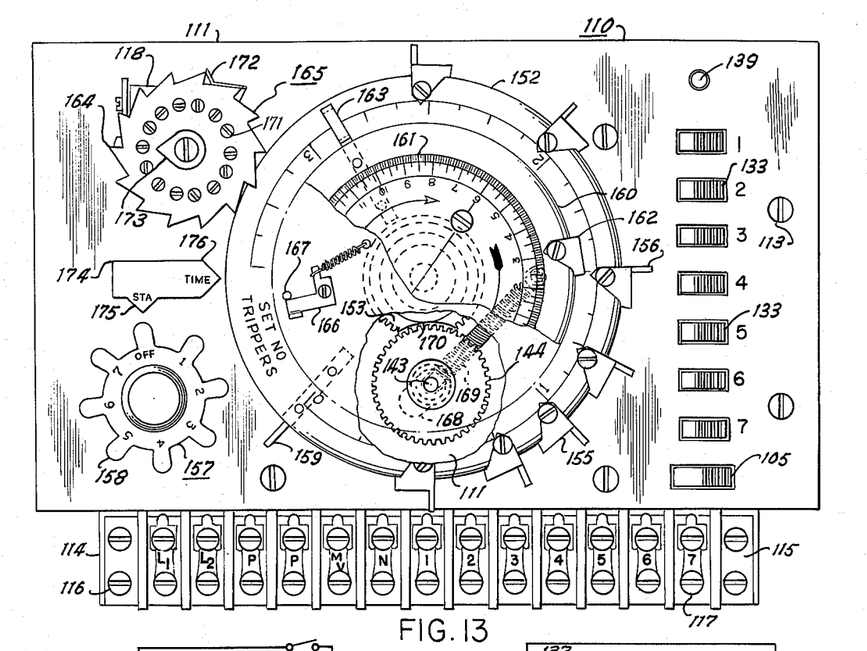
FIG. 13 is a front elevational view, having portions broken away, of a preferred embodiment of the invention.
Figure 14:
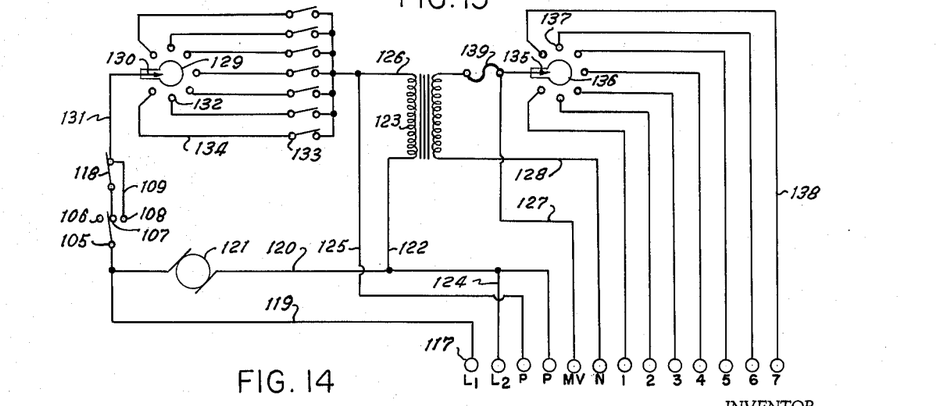
FIG. 14 is a schematic view of the wiring diagram for the preferred control.

A preferred embodiment of the invention is shown in FIGS. 13-17 and includes a chassis 110 similar to the chassis 10 and having similar upright plates 111 and 112, connecting posts 113, offset flange 114, terminal block 115, fasteners 116 and terminals 117. As shown in FIG. 14, the terminals 117 are connected with a source of electrical current at L1 and L2, a pump starter at P and P, a main control mechanism at MV, a ground or neutral at N, and secondary or station control mechanisms or valves at 1 through 7, the number of which may vary. A switch 118, similar to the switch 29, is connected to the terminal L1 by a lead 119 from which a lead 120 extends to a clock motor 121 and to one of the P terminals. The lead 120 is connected by a lead 122 to a transformer 123 and to the L2 terminal by a lead 124. Leads 125 and 126 connect the other P terminal to the transformer 123; while leads 127 and 128 connect the low voltage side of said transformer to the MV and N terminals, respectively. A conventional rotary selector switch 129 has its wiper arm 130 connected to the switch 118 by a lead 131 and its multiple contacts 132 to a plurality of manual switches 133 by separate leads 134, the manual switches 133 being connected to the transformer by the lead 126 and to the other P terminal by the lead 125.

In addition to connecting the transformer 123 to the MV terminal, the lead 127 connects said transformer to the wiper arm 135 of a rotary selector switch 136 which is similar to the switch 36 as well as the switch 129 and which has similar multiple contacts 137, one for each of the 1-7 terminals and connected thereto by separate leads 138. The contacts 132 of the switch 129 and the manual switches 133 correspond to the contacts 137 and 1-7 terminals. A fuse or circuit breaker 139 may be connected in the lead 127 between the transformer and the wiper arm 135. Between the switch 118 and the lead 120, the lead 119 has a master switch 105 connected therein. The master switch has three contacts 106, 107 and 108, the contact 106 being open to prevent operation of the control, the contact 107 being connected to the switch 118 for automatic operation of the time control, and the contact 108 bypassing said switch 118 and being connected to the lead 131 by means of a lead 109 for manual and semiautomatic operation of said control.

Figure 15:
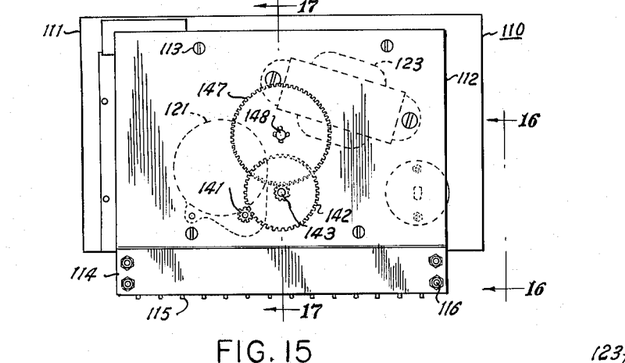
FIG. 15 is a reduced, rear elevation of the preferred control.
Figures 16, 17:
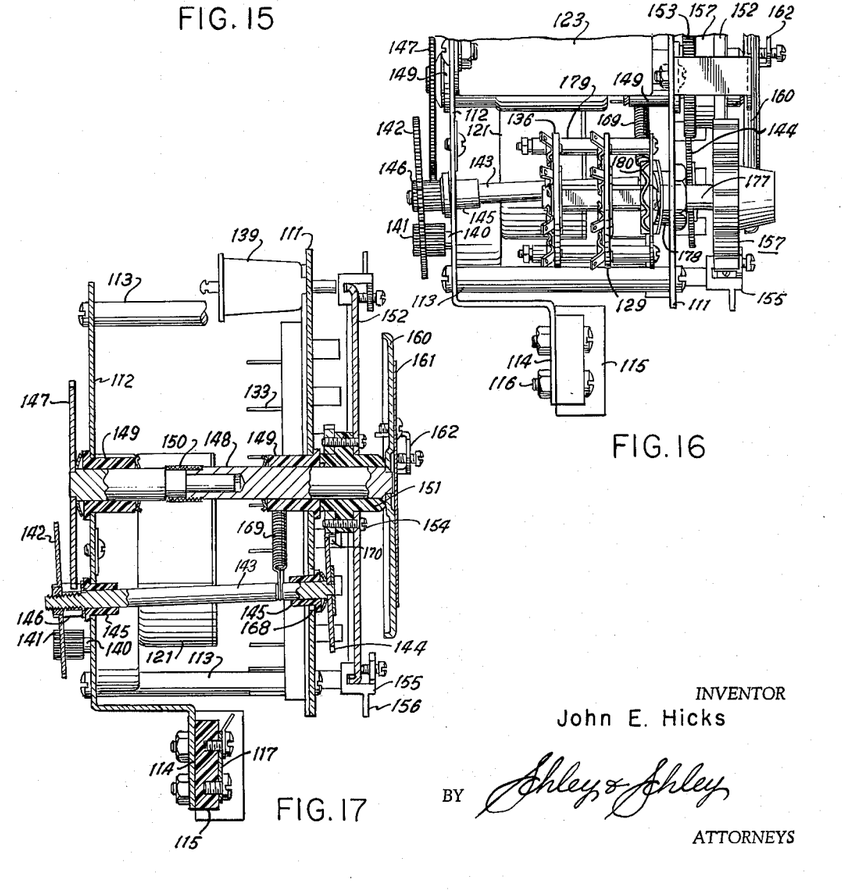
FIG. 16 is an enlarged, end elevational view, taken on the line 16—16 of FIG. 15.
FIG. 17 is an enlarged, transverse, vertical, sectional view, taken on the line 17—17 of FIG. 15.

As shown in FIGS. 15–16, the clock motor 121 has its drive shaft 140 projecting rearwardly through the back plate 112 for supporting a pinion 141 in meshing engagement with a gear 142 of much larger diameter. A shaft 143, having the gear 142 fixed on its rear end and a similar gear 144 on its front end, extends transversely between and projects exteriorly of the front and back plates through bearings 145. The rear end of the shaft 143 also carries a pinion 146 in meshing engagement with a relatively-large gear 147 which is mounted on the rear end of a shaft 148. Suitable bearings 149 in the front and back plates 111 and 112 support the front and rear ends of the shaft 148 which extends transversely between and projects through said plates. Preferably, the shaft 148 is provided with an overriding drive clutch 150. A flanged bushing 151, similar to the bushing 48, is journaled on the front end of the shaft 148 for supporting a circular dial or disk 152 and a gear 153 whereby the disk and gear are rotatable relative to said shaft. The disk and gear are fastened to the flange of the bushing 151 by suitable screws 154.

Since the disk 152 is identical to the disk 50, it will not be described in detail. Actuating elements or clips 155, similar to the clips 57 and having similar arms 156, are adjustably mounted on the periphery of the disk and function as trippers for imparting rotation to a star wheel or rotary member 157 which is similar to the star wheel 60 and has similar points or teeth 158 (FIG. 13). Also, the disk carries an actuating element or starting finger 159, similar to the finger 63, for contact with the points 158 of the star wheel 157. A circular dial or disk 160, of less diameter than the disk 152 and substantially identical to the disk 65, is fixed on the front end of the shaft 148 for rotation therewith and carries a twenty-four (24) hour dial plate or clock face 161, one or more armless actuating elements or clips 162 and an angularly-offset actuating element 163 for driving engagement with the ratchet teeth 164 of a calendar wheel or rotary member 165, all of which are substantially identical to the dial face 67, clips 70, finger 71 and calendar wheel 74. Also, the disk 160 is arranged to be drivingly connected to the disk 152 by a spring-pressed pawl 166 and post 167 on said disk 152, similar to the pawl 75 and post 77, when the pawl 166 is engaged by one of the clips 162 of said disk 160. Although the disk 152 is adapted to be driven clockwise by the disk 160, the pivotal mounting of the pawl 166 permits it to bypass or overrun the clips 162 and permit clockwise rotation of said disk 152 relative to said disk 160. As has been explained in connection with the disks 50 and 65, this is necessary due to the larger disk revolving at a greater rate of speed than the smaller disk.

The disk 152 and its gear 153 are adapted to be driven clockwise (FIG. 13) by the gear 144 which is mounted on the shaft 143 and constantly driven by means of the gear 142 and pinion 141. Although the shaft 143 extends substantially parallel to the shaft 148, its front bearing 145 is slidably mounted in an inclined, elongate opening or slot 168 extending diagonally of the front plate 111 to permit movement of the gear 144 upwardly toward and downwardly away from the gear 153. A helical spring 169 is connected to the shaft 143 for constantly urging the gear 144 toward the gear 153 and, as shown by the numeral 170 in FIGS. 13 and 17, said gear 153 has a semi-circular recess or cutaway portion in its periphery to prevent meshing of the gears when the disk 152 is in the position shown. The recess 170 is complementary to the periphery of the gear 144 and prevents driving of the gear 153 and rotation of the disk 152 until one of the clips 162 of the disk 160 strikes the pawl 166 of said disk 152 and turns said disk and its gear 153 sufficiently to move said recess out of engagement with said gear 144. Thus, the disk 152 may remain stationary during rotation of the disk 160.

As shown in FIG. 13, the master switch 105, manual switches 133 and circuit breaker 139 are suitably mounted on the rear surface of the front plate 111 of the chassis 110 and the switch 118 is mounted on the front surface of said front plate in underlying relation to the calendar wheel 165 for actuation by its pins or screws 171. The latter correspond in number to the teeth 164 and are substantially identical to the screws 96 of the calendar wheel 74. A resilient detent 172 is carried by the front plate for engaging the ratchet teeth to resist rotation of the wheel 165 and prevent reverse or clockwise turning of said wheel and, preferably, said wheel is provided with a pointer 173. An indicator 174, similar to the indicator 98 and having similar STA and TIME pointers 175 and 176, is suitably mounted on the front plate between the wheels 157 and 165. Although the calendar wheel 165 may be identical to the calendar wheel 74 and mounted in the same manner, the star wheel 157 lacks the screws 95 in view of the provision of the rotary selector switch 129 instead of a switch of the type as switch 28 or 118. As shown in FIG. 16, a transverse shaft 177 extends through a bushing 178 in the front plate 111 for supporting the star wheel and has the wiper arms 130 and 135 of the rotary selector switches 129 and 136 fixed on its rear portion. The selector switches are supported in alinement with the star wheel 157 by suitable posts 179 and a conventional position-retaining member 180 which is mounted on the bushing 178.

In order to operate the preferred embodiment of the invention automatically, the master switch 105 is engaged with its center contact 107, all or any number of the manual switches 133 are closed, the calendar wheel 165 is provided with desired arrangement and number of screws 171 to determine the frequency of operation, the clips 156 and 162 are positioned on the disks 152 and 160 in accordance with the desired frequency of actuation of the star and calendar wheels 157 and 165, said star wheel is turned to the position shown in FIG. 13 so that the wiper arms 130 and 135 of the rotary selector switches 129 and 136 are disengaged from the contacts 132 and 137 as shown in FIG. 14, and the starting finger 159 of said disk 152 is positioned adjacent said star wheel so that the legend SET NO TRIPPERS is adjacent the TIME pointer 176 and so that the recess 170 of the gear 153 is engaged with the gear 144. Due to the constant clockwise driving of the disk 160 by the motor 121 through the pinions 141 and 146 and gears 142 and 147, the finger 163 strikes the adjacent tooth 164 of the calendar wheel 165 and turns said wheel counterclockwise whereby one of its screws 171 may engage and close the switch 118. One of the clips 162 engages the pawl 166 upon continued rotation of the disk 160, so as to rotate the disk 152 clockwise and disengage the recess 170 of the gear 153 from the gear 144 and thereby permit the gears to mesh and the driving of said gear 153 by said gear 144. Since the disk 152 is rotated at a greater speed, it revolves relative to the disk 160 and moves its pawl out of engagement with the engaged clip of said disk 160 as well as past any other clips thereof.

Due to this rotation, the finger 159 strikes the 2 point of the star wheel 157 and turns said wheel counterclockwise to rotate the wiper arms 130 and 135 of the rotary selector switches 129 and 136 into engagement with the contacts 132 and 137 which are connected to the first manual switch 133 and 1 terminal. Assuming that the latter switch and the switch 118 are closed, electrical current is supplied through the transformer 123 to the wiper arm 135 for operating the valve or other mechanism of the 1 terminal. This operation continues as described in connection with the first embodiment of the invention, the rotation of the wiper arm 130 taking the place of the actuation of the switch 28 by the screws 95 of the star wheel 60, until the last clip 155 strikes the 1 point of the star wheel 157 and moves its OFF point adjacent the STA pointer of the indicator 174 (FIG. 13). The wiper arms of the rotary selector switches are returned to the position shown in FIG. 14 and the gear recess 170 engages the gear 144 to prevent continued rotation of the disk 152. Another cycle of operation commences when one of the clips 162 of the disk 160 again engages the pawl 166 of the disk 152. The control may be operated manually by engaging the master switch 105 with the contact 108 and turning the star wheel 157. Manifestly, the overriding drive clutch 150 of the shaft 148 facilitates the setting of the clock face 161 and minimizes the transmission of torque through the gear train upon clockwise rotation of the disk 160. As set forth in connection with the disks 50 and 65, the disk 152 is adapted to complete a revolution in four (4) hours and the disk 160 makes one complete revolution every twenty-four (24) hours; however, both periods of time are subject to variation.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An automatic time control for successively supplying electrical current to a plurality of electrically operated mechanisms including a rotary selector switch means having a plurality of contacts corresponding in number to the number of mechanisms for directing electrical current thereto, means for imparting intermittent rotation to the switch means so as to advance said switch means step by step, the rotation imparting means including a rotary member and an adjacent coacting member which is rotatable with said switch means, actuating means on the rotary member for engaging and imparting intermittent rotation to the coacting member upon turning of said rotary member, drive means for turning said rotary member, and means for operatively connecting and disconnecting the drive means to and from said rotary member so as to regulate the intervals between turning of said rotary member.

2. An automatic time control as set forth in claim 1 wherein the actuating means includes a plurality of elements adjustably mounted on the rotary member for regulating the intervals between rotation of the rotary selector switch means and the coacting member of the means for imparting intermittent rotation to said rotary selector switch means.

3. An automatic time control as set forth in claim 1 including means responsive to rotation of the coacting member of the intermittent rotation imparting means for directing electrical current to the rotary selector switch means.

4. An automatic time control as set forth in claim 1 including a second rotary selector switch means rotatable with the coacting member of the intermittent rotation imparting means and having a plurality of contacts corresponding in number to the number of electrically operated mechanisms for directing electrical current to the first rotary selector switch means.

5. An automatic time control as set forth in claim 1 wherein the drive means includes a driven gear rotatable with the rotary member and a drive gear mounted for movement into and out of mesh with the driven gear, the connecting and disconnecting means having means for biasing the drive gear into mesh with said driven gear and means for holding said drive gear out of mesh.

6. An automatic time control as set forth in claim 1 wherein the drive means includes a driven gear rotatable with the rotary member and a drive gear for meshing with the driven gear, a drive shaft supporting the drive gear and mounted for movement toward and away from said driven gear to move said drive gear into and out of mesh, the connecting and disconnecting means having means for urging the drive shaft toward said driven gear, means rotatable with said rotary member and driven gear for engaging said drive shaft to hold said drive gear out of mesh, and means for moving the rotatable means out of engagement with said drive shaft to permit movement thereon toward said driven gear and meshing of said drive gear.

7. An automatic time control as set forth in claim 6 wherein the means for moving the rotatable means out of engagement with the drive shaft includes means for imparting rotation to the rotary member.

8. An automatic time control as set forth in claim 1 including a rotatable member, means responsive to rotation of the rotatable member for directing electrical current to the rotary selector switch means, the drive means including a second rotary member adjacent said rotatable member and carrying means for engaging and imparting intermittent rotation to said rotatable member, and means for constantly rotating the second rotary member.

9. An automatic time control as set forth in claim 8 including a plurality of actuating means carried by the rotatable member for sequential engagement with and actuation of the responsive means upon rotation of said rotatable member.

10. An automatic time control as set forth in claim 9 including means responsive to rotation of the coacting member of the intermittent rotation imparting means for directing electrical current to the rotary selector switch means.

11. An automatic time control as set forth in claim 9 including a second rotary selector switch means rotatable with the coacting member of the intermittent rotation imparting means and having a plurality of contacts corresponding in number to the number of electrically operated mechanisms for directing electrical current to the first rotary selector switch means.

12. An automatic time control as set forth in claim 8 wherein the actuating means of the first rotary member includes a plurality of elements adjustable circumferentially of said first rotary member for regulating the intervals between rotation of the rotary selector switch means and the coacting member of the means for imparting intermittent rotation to said switch means.

13. An automatic time control as set forth in claim 8 wherein the drive means for the first rotary member includes a driven gear rotatable with said first rotary member and a drive gear mounted for movement into and out of mesh with the driven gear, the connecting and disconnecting means having means for biasing the drive gear into mesh with said driven gear and means rotatable with said driven gear for holding said drive gear out of mesh.

14. An automatic time contrrol as set forth in claim 8 wherein the drive means for the first rotary member includes a driven gear rotatable with said first rotary member and a drive gear for meshing with the driven gear, a drive shaft supporting the drive gear and mounted for movement toward and away from said driven gear to move said drive gear into and out of mesh, the connecting and disconnecting means having resilient means for urging the drive shaft toward said driven gear, cam means rotatable with said first rotary member for engaging said drive shaft to hold said drive gear out of mesh, and means rotatable with the constantly rotating second rotary member for imparting rotation to said first rotary member to move the cam means out of engagement with said drive shaft so as to permit movement of said shaft toward said driven gear and meshing of said drive gear therewith.

15. An automatic time control as set forth in claim 14 wherein the means rotatable with the second rotary member for imparting rotation to said first rotary member includes at least one element mounted on said second rotary member, and an element mounted on said first rotary member engageable by the element of said second rotary member.

16. An automatic time control as set forth in claim 15 wherein one of the elements is pivoted for movement in one direction to permit rotation of the first rotary member relative to the second rotary member.

17. An automatic time control as set forth in claim 14 wherein the rotary members are coaxial, the means rotatable with the second rotary member for imparting rotation to the first rotary member including at least one element adjustably mounted on said second rotary member, and a spring-pressed pawl pivotally mounted on said first rotary member for relative movement in a direction opposite to the rotation thereof to permit rotation of said first rotary member relative to said second rotary member, the pawl being engageable by the element of said second rotary member for transmitting rotation therefrom to said first rotary member.

18. An automatic time control as set forth in claim 8 including means responsive to rotation of the coacting member of the intermittent rotation imparting means for directing electrical current to the rotary selector switch means.

19. An automatic time control as set forth in claim 8 including a second rotary selector switch means rotatable with the coacting member of the intermittent rotation imparting means and having a plurality of contacts corresponding in number to the number of electrically operated mechanisms for directing electrical current to the first rotary selector switch means.

20. An automatic time control as set forth in claim 8 wherein the drive means for the first rotary member includes a driven gear rotatable with said first rotary member and a drive gear mounted for meshing engagement with the driven gear, the connecting and disconnecting means including means rotatable with said driven gear for unmeshing the gears.

21. An automatic time control as set forth in claim 20 wherein the means for unmeshing the gears includes an untoothed portion on the driven gear, and means rotatable with the constantly rotating second rotary member for imparting rotation to the first rotary member to move the untoothed portion of said driven gear past the drive gear and permit meshing of the gears.

22. An automatic time control as set forth in claim 21 wherein the means rotatable with the second rotary member for imparting rotation to said first rotary member includes at least one element mounted on said second rotary member, and an element mounted on said first rotary member engageable by the element of said second rotary member.

23. An automatic time control as set forth in claim 22 wherein one of the elements is pivoted for movement in one direction to permit rotation of the first rotary member relative to the second rotary member.

24. An automatic time control as set forth in claim 21 wherein the rotary members are coaxial, the means rotatable with the second rotary member for imparting rotation to the first rotary member including at least one element adjustably mounted on said second rotary member, and a spring-pressed pawl pivotally mounted on said first rotary member for relative movement in a direction opposite to the rotation thereof to permit rotation of said first rotary member relative to said second rotary member, the pawl being engageable by the element of said second rotary member for transmitting rotation therefrom to said first rotary member.

25. An automatic time control as set forth in claim 1 wherein the drive means for the rotary member includes a driven gear rotatable with said rotary member and a drive gear mounted for meshing engagement with the driven gear, the connecting and disconnecting means including means rotatable with said driven gear for unmeshing the gears.

26. An automatic time control as set forth in claim 25 wherein the means for unmeshing the gears includes an untoothed portion on the driven gear, and means for imparting rotation to the rotary member to move the untoothed portion of said driven gear past the drive gear and permit meshing of the gears.

References Cited by the Examiner
UNITED STATES PATENTS

| | | | |
|---|---|---|---|
| 2,591,124 | 4/52 | Boyan | 200—33 |
| 2,736,173 | 2/56 | Duncan | 200—38 |
| 2,905,239 | 9/59 | Dietz | 200—37 |
| 3,101,418 | 8/63 | Gould | 200—37 |
| 3,123,681 | 3/64 | Martini | 200—33 |

BERNARD A. GILHEANY, *Primary Examiner.*

ROBERT K. SCHAEFER, *Examiner.*